(No Model.) 2 Sheets—Sheet 1.

J. D. GREENE.
ONE WHEELED VEHICLE.

No. 346,813. Patented Aug. 3, 1886.

Attest:
John Schuman
N Sprague

Inventor:
J. Durell Greene.
by his Atty
Thos. S. Sprague (No Model.) 2 Sheets—Sheet 2.

J. D. GREENE.
ONE WHEELED VEHICLE.

No. 346,813. Patented Aug. 3, 1886.

Attest:
John Schuman.

Inventor
J. Durell Greene.
by his Atty

UNITED STATES PATENT OFFICE.

J. DURELL GREENE, OF YPSILANTI, MICHIGAN.

ONE-WHEELED VEHICLE.

SPECIFICATION forming part of Letters Patent No. 346,813, dated August 3, 1886.

Application filed April 22, 1886. Serial No. 199,752. (No model.)

*To all whom it may concern:*

Be it known that I, J. DURELL GREENE, of Ypsilanti, in the county of Washtenaw and State of Michigan, have invented new and useful Improvements in One-Wheeled Vehicles; and I do hereby declare that the following is a full, clear, and exact description thereof, reference being had to the accompanying drawings, which form a part of this specification.

This invention relates to a new and useful improvement in vehicles; and the invention consists in the peculiar construction and arrangement of a one-wheeled vehicle adapted for use as a road-cart, all as more fully hereinafter set forth.

Figure 1:
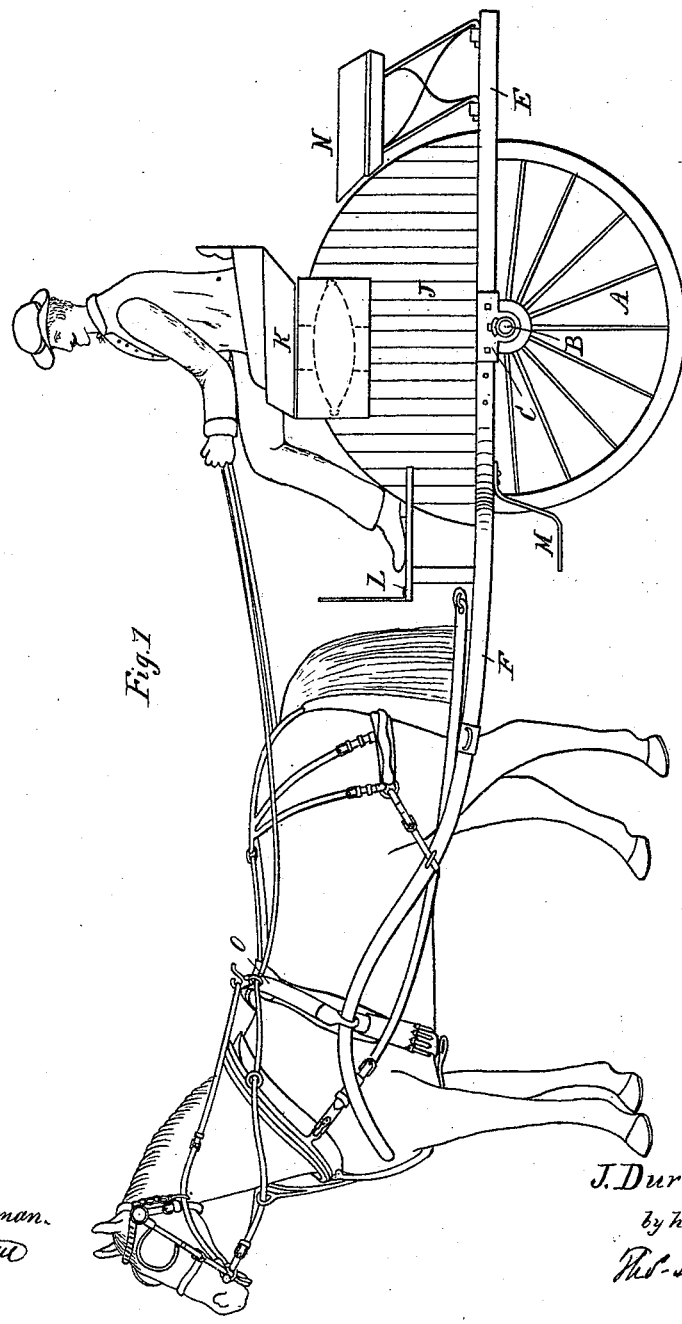
Figure 2:
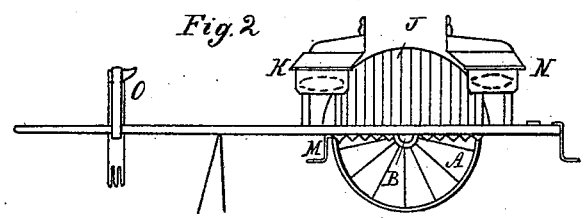
Figure 3:
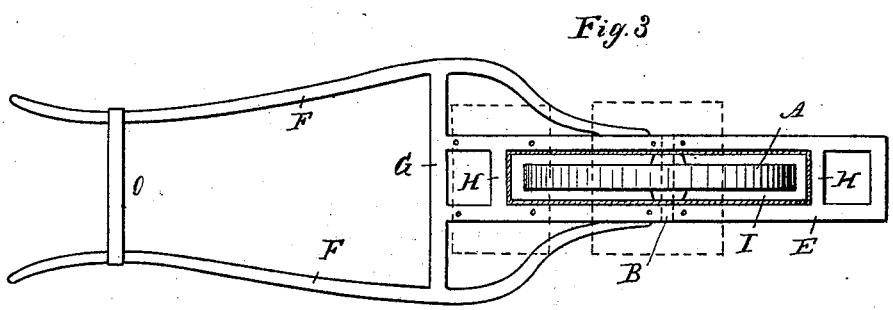
Figure 4:
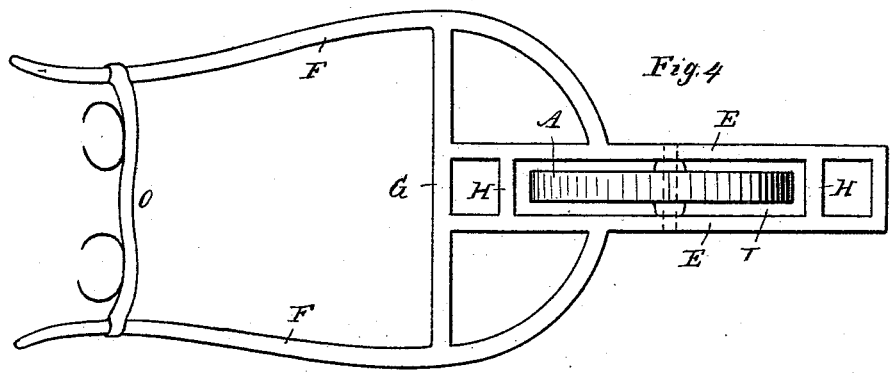
Figure 5:
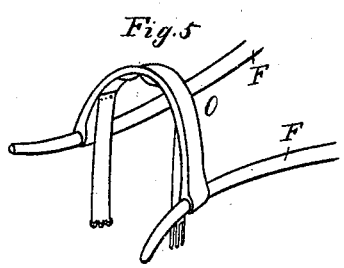

Figure 1 is a general view of one of my improved vehicles "hitched up" and ready for driving. Fig. 2 is an elevation of the road-cart with a slight modification in the arrangement of the seats. Fig. 3 is a plan view of the gear. Fig. 4 is a similar plan view of a cart constructed for two horses. Fig. 5 is a detail perspective showing the arrangement of the bow which connects the forward ends of the shafts and the surcingle.

In the accompanying drawings, which form a part of this specification, A is the wheel of the cart. It is preferably of a larger tread than ordinarily used for similar vehicles.

B is the axle, journaled in suitable bearings, C.

E are side bars, secured together by cross-girts H to form a rectangular well, I, large enough to accommodate the wheel so it may freely revolve.

F are the shafts of the vehicle. They are made stiff, and are secured at their rear ends to the side bars in any desired manner that will make of the whole combination a rigid frame. To this end I preferably bend the rear ends of the thills inwardly, as shown, and secure them firmly by bolts or otherwise to the side bars, and by means of a cross-girt, G, I connect the thills and the forward ends of the side bars.

J is a cylindrical casing secured to the frame around the well and covering the upper portion of the wheel, to prevent the spattering of dirt.

K is the driver's seat. It is sufficiently wide to seat a single person, and may be placed either directly over the wheel or a little forward thereof, as shown in Fig. 2. It is preferably supported on springs, either on the casing or upon the side bars, a lateral support being given to it by setting it astride the casing, or partly so.

L is a foot-board conveniently placed for the driver's feet, and a suitable step, M, permits of mounting and dismounting readily. A second seat, N, is arranged in rear of the wheel. This seat may be made a counter part of the front seat, as in Fig. 2, or it may be somewhat lower, as the rear seat in Fig. 1, which latter can be reversed, so as to make it face either to the front or rear, as desired.

In driving the balance of the cart is maintained by the horse. To this end the forward ends of the thills are connected by a rigid bow, O, to which a surcingle or belly-band is secured in any suitable way that will firmly hold the bow in position on the horse's back, provided the surcingle is applied tightly around the horse's belly. The bow makes the thills more rigid, and acts as a brace to counteract any tipping of the cart without impeding the perfect freedom of the horse. On a cart so constructed the driver by judicious management and assistance on his own part can maintain the equilibrium of the device with the greatest ease.

The vehicle is perfectly applicable to the needs of many classes of persons—such as physicians, who often have to go over roads impassable for other vehicles—and, besides, it affords capital enjoyment to all lovers of sport.

The vehicle can be built absolutely safe by constructing it for use with two horses, as shown in Fig. 4, in which case the thills are preferably made wide enough to receive the two horses between them with a double bow connecting the thills and carrying a belly-band for each horse, as herein described.

I am aware of the Patent No. 270,076, and make no claim to the construction shown therein as forming part of my invention.

I am also aware of the Patent No. 99,114, and make no claim to the construction shown therein. I deem it important that the shafts connect with the side bars, E, in front of but near the axle of the wheel, for this arrangement renders the device less liable to be tipped.

What I claim as my invention is—

1. In a one-wheeled vehicle, the combination, with the side bars, E, and the wheel A, journaled therein, of the cross-girts H, connecting said cross-bars in rear and front of said wheel, the shafts F, secured to said side bars in front of and near to the axle of the wheel, the cross-girt G, connecting said shafts and the front ends of said side bars, and the double rigid bow O, joining the forward ends of the shafts and provided with a belly-band for each horse, substantially as and for the purpose specified.

2. In a one-wheeled vehicle, the combination of the side bars, E, and the wheel A, journaled in said side bars, with the cylindrical casing J resting upon and secured to said side bars, and the seat K, set astride the casing and supported by the shafts, resting upon springs secured to said casing, substantially as shown and described.

J. DURELL GREENE.

Witnesses:
  H. S. SPRAGUE,
  FRANK JOSLYN.